(12) United States Patent
In et al.

(10) Patent No.: US 12,738,616 B2
(45) Date of Patent: Sep. 15, 2026

(54) BATTERY MODULE HAVING DISCHARGE STRUCTURE AND BATTERY PACK INCLUDING THE SAME

(71) Applicant: LG ENERGY SOLUTION, LTD., Seoul (KR)

(72) Inventors: Jeonghyeon In, Daejeon (KR); Youngho Lee, Daejeon (KR); Junkyu Park, Daejeon (KR); Soo Youl Kim, Daejeon (KR); Han Ki Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1022 days.

(21) Appl. No.: 17/792,054

(22) PCT Filed: Jul. 9, 2021

(86) PCT No.: PCT/KR2021/008827
§ 371 (c)(1),
(2) Date: Jul. 11, 2022

(87) PCT Pub. No.: WO2022/014974
PCT Pub. Date: Jan. 20, 2022

(65) Prior Publication Data

US 2023/0043832 A1 Feb. 9, 2023

(30) Foreign Application Priority Data

Jul. 17, 2020 (KR) ........................ 10-2020-0088725

(51) Int. Cl.
*H01M 50/691* (2021.01)
*H01M 50/211* (2021.01)
(Continued)

(52) U.S. Cl.
CPC ....... *H01M 50/691* (2021.01); *H01M 50/211* (2021.01); *H01M 50/271* (2021.01); *H01M 50/507* (2021.01)

(58) Field of Classification Search
CPC ............. H01M 50/691; H01M 50/211; H01M 50/507; H01M 50/271
See application file for complete search history.

(56) References Cited

U.S. PATENT DOCUMENTS

2013/0130073 A1* 5/2013 Kim ...................... H01M 50/60 429/61
2013/0224539 A1 8/2013 Hayashi et al.
(Continued)

FOREIGN PATENT DOCUMENTS

CN 205177900 U 4/2016
CN 109216623 A 1/2019
(Continued)

OTHER PUBLICATIONS

EPO machine generated English translation of CN-110289376-A (Year: 2019).*

(Continued)

*Primary Examiner* — Kimberly Wyluda
(74) *Attorney, Agent, or Firm* — Birch, Stewart, Kolasch & Birch, LLP

(57) ABSTRACT

A battery module includes: a battery cell stack in which a plurality of battery cells are stacked; a module frame for accommodating the battery cell stack; and an end plate for covering the front and rear surfaces of the battery cell stack, wherein an opening is formed between the module frame bottom portion and the end plate.

14 Claims, 6 Drawing Sheets

(51) Int. Cl.
*H01M 50/271* (2021.01)
*H01M 50/507* (2021.01)

(56) References Cited

U.S. PATENT DOCUMENTS

| | | | | |
|---|---|---|---|---|
| 2013/0323560 | A1* | 12/2013 | Choo | H01M 50/249 429/99 |
| 2014/0356665 | A1 | 12/2014 | Hayashi et al. | |
| 2015/0132634 | A1* | 5/2015 | Sera | H01M 10/625 429/153 |
| 2015/0147613 | A1 | 5/2015 | Hayashida et al. | |
| 2015/0287963 | A1 | 10/2015 | Chiba | |
| 2016/0233463 | A1 | 8/2016 | Hayashi et al. | |
| 2017/0110709 | A1 | 4/2017 | Kolen et al. | |
| 2018/0026241 | A1 | 1/2018 | Hayashi et al. | |
| 2019/0006647 | A1 | 1/2019 | Ryu et al. | |
| 2019/0131596 | A1 | 5/2019 | Yang et al. | |
| 2020/0076025 | A1 | 3/2020 | Jo et al. | |
| 2020/0112014 | A1 | 4/2020 | Kim et al. | |
| 2021/0066679 | A1 | 3/2021 | Chen et al. | |
| 2021/0126313 | A1 | 4/2021 | Lee et al. | |
| 2021/0226291 | A1 | 7/2021 | Kim et al. | |
| 2022/0006164 | A1* | 1/2022 | Egashira | H01M 10/613 |

FOREIGN PATENT DOCUMENTS

| | | | | |
|---|---|---|---|---|
| CN | 110289376 | A * | 9/2019 | H01M 10/635 |
| CN | 210167432 | U | 3/2020 | |
| CN | 111306280 | A | 5/2020 | |
| JP | 2006-318703 | A | 11/2006 | |
| JP | 2014-103051 | A | 6/2014 | |
| JP | 5683942 | B2 | 3/2015 | |
| JP | 2017-98011 | A | 6/2017 | |
| JP | 6204353 | B2 | 9/2017 | |
| JP | 6679910 | B2 | 4/2020 | |
| KR | 10-2005-0017496 | A | 2/2005 | |
| KR | 10-1347985 | B1 | 1/2014 | |
| KR | 10-2018-0018109 | A | 2/2018 | |
| KR | 10-1943105 | B1 | 1/2019 | |
| KR | 10-2019-0063109 | A | 6/2019 | |
| KR | 10-2019-0064887 | A | 6/2019 | |
| KR | 10-2019-0073933 | A | 6/2019 | |
| KR | 10-2020-0008624 | A | 1/2020 | |
| KR | 10-2020-0068478 | A | 6/2020 | |
| KR | 10-2017-0034520 | A | 6/2026 | |
| WO | WO 2013/179798 | A1 | 12/2013 | |
| WO | WO-2018124494 | A2 * | 7/2018 | G01R 31/36 |

OTHER PUBLICATIONS

EPO machine generated English translation of WO-2018124494-A2 (Year: 2018).*

EPO machine generated English translation of CN 210167432 U (Year: 2020).*

International Search Report (PCT/ISA/210) issued in PCT/KR2021/008827, dated Nov. 9, 2021.

* cited by examiner

【FIG. 1】
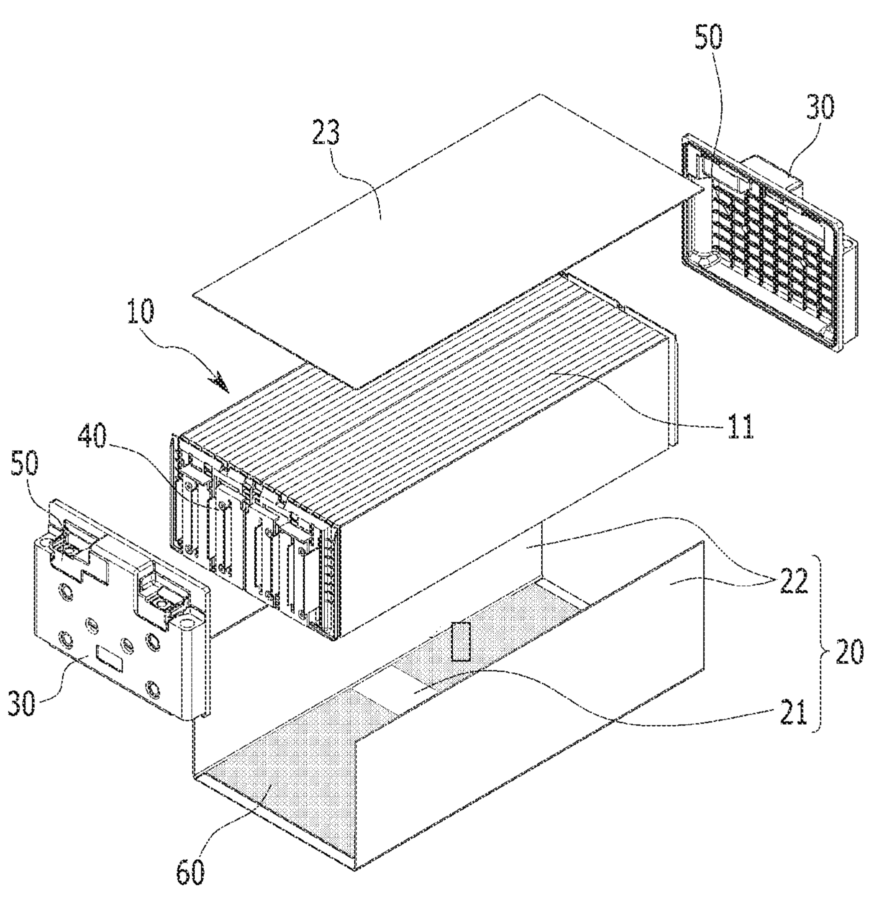

【FIG. 2】
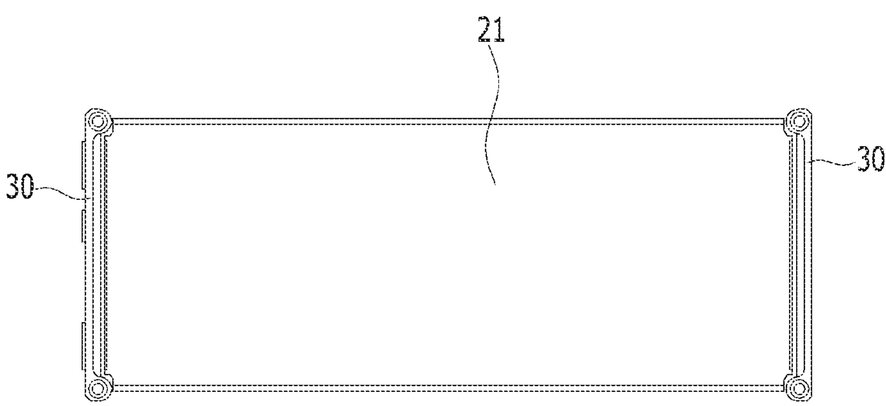

【FIG. 3】
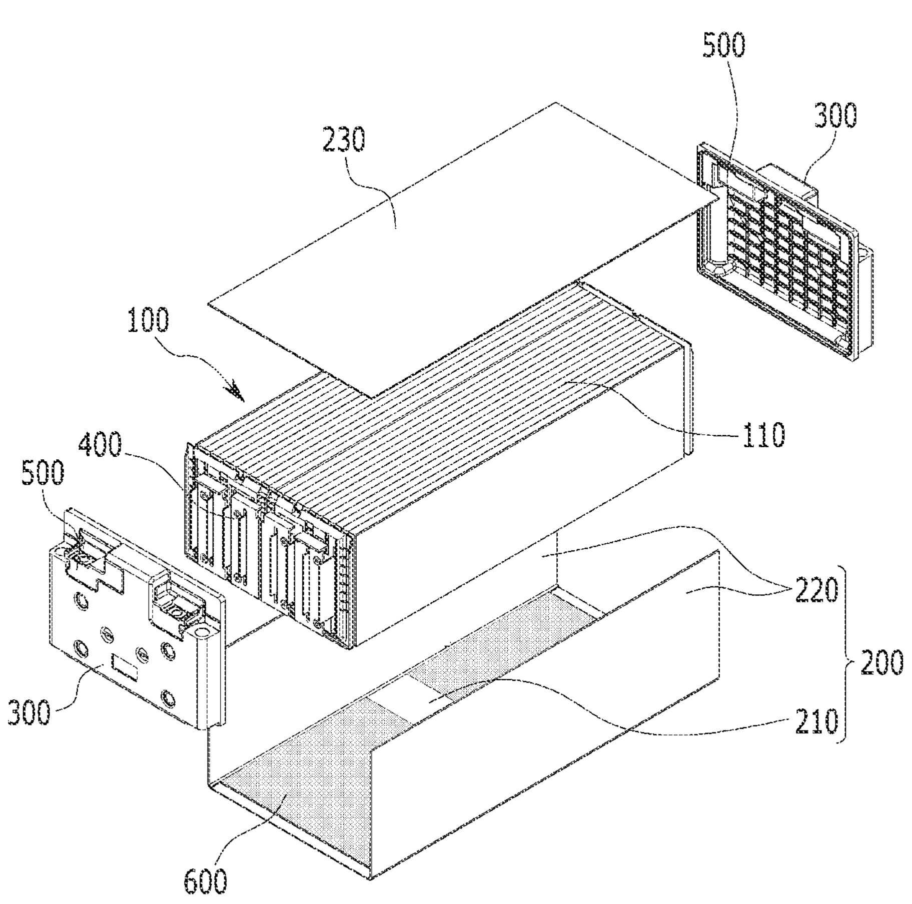

【FIG. 4】
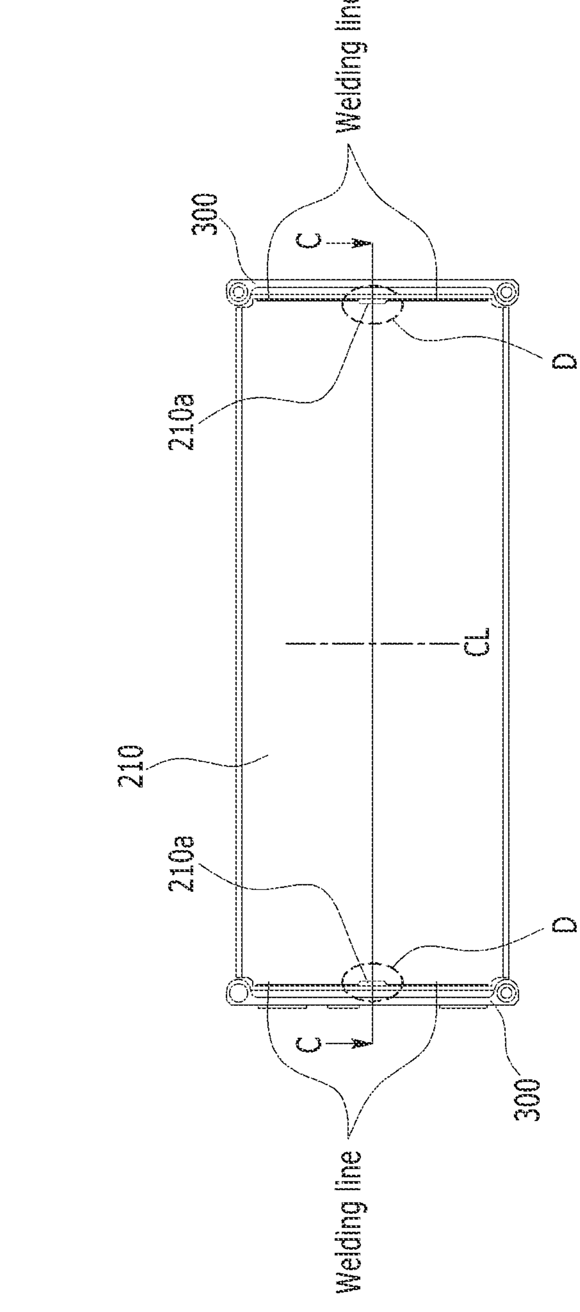

【FIG. 5】
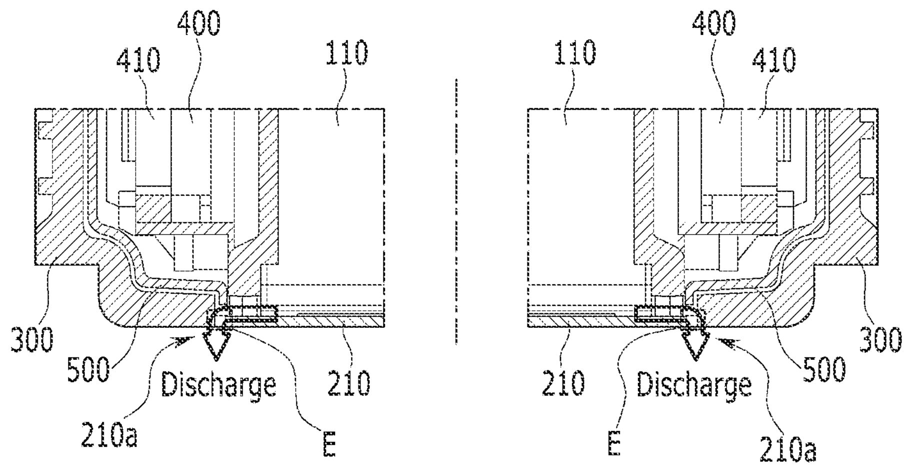
【FIG. 6】
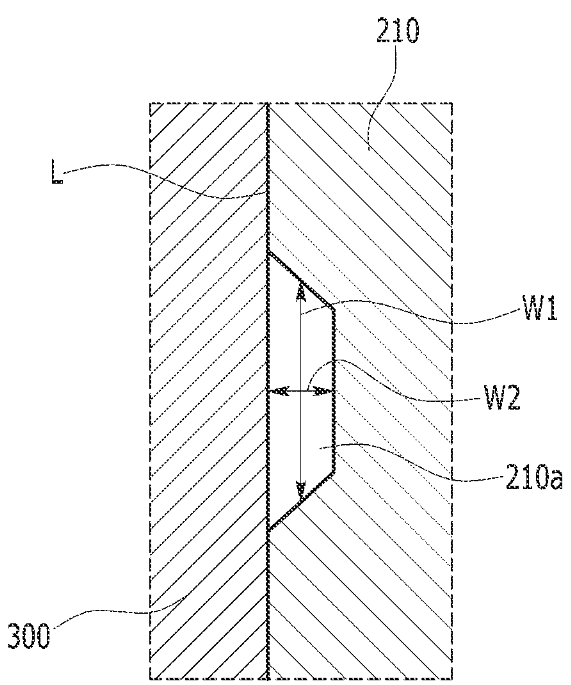

【FIG. 7】
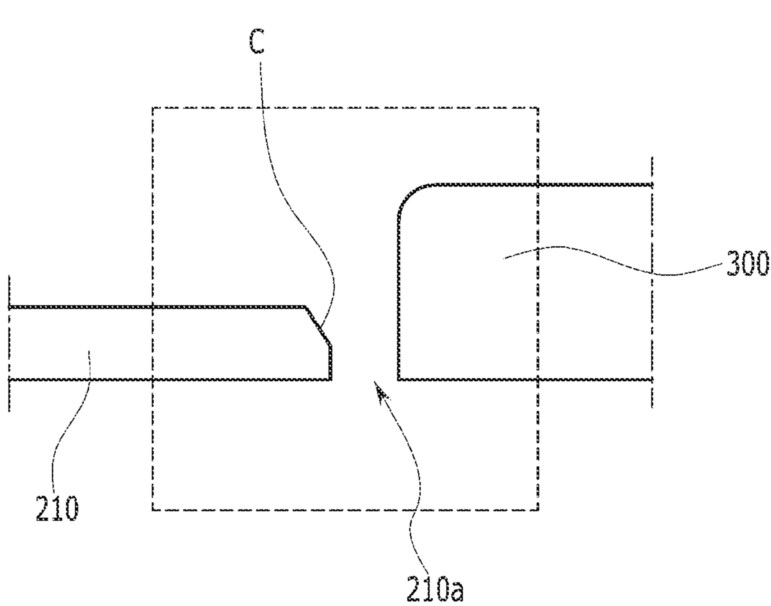

BATTERY MODULE HAVING DISCHARGE STRUCTURE AND BATTERY PACK INCLUDING THE SAME

CROSS CITATION WITH RELATED APPLICATION(S)

This application claims the benefit of Korean Patent Application No. 10-2020-0088725 filed on Jul. 17, 2020 with the Korean Intellectual Property Office, the disclosure of which is incorporated herein by reference in its entirety.

TECHNICAL FIELD

The present disclosure relates to a battery module and a battery pack including the same, and more particularly, to a battery module for preventing a short circuit between busbars, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

Such a battery module may include a battery cell stack in which a plurality of battery cells are stacked, a module frame for accommodating the battery cell stack, a busbar frame for covering the front and rear surfaces of the battery cell stack and is equipped with a busbar, and an end plate for covering the front and rear surfaces of the battery cell stack.

FIG. 1 is an exploded perspective view of a conventional battery module. FIG. 2 is a cross sectional view of a conventional battery module.

Referring to FIGS. 1 and 2, a conventional battery module includes a battery cell stack 10 in which a plurality of battery cells 11 are stacked, a U-shaped frame 20 for accommodating the battery cell stack 10, an upper plate 23 for covering the upper side surface of the battery cell stack 10, a busbar frame 40 for covering the front and rear surfaces of the battery cell stack 10, an end plate 30 for covering busbar frame 40, and an insulating cover 50 formed between the busbar frame 40 and the end plate 30.

In this case, the U-shaped frame is formed of a bottom portion 21 and both side portions 22, and a thermal conductive resin layer 60 may be formed on an upper side of the bottom portion 21. As shown in FIG. 2, conventionally, a connection passage to the outside is not formed in the lower side portion of the battery module bottom portion 21.

In the case of the battery module, internal condensed water may be generated under environmental conditions with high temperature and high humidity. Also, an electrolyte solution may leak from the plurality of battery cells. Such condensed water or electrolyte solution may be accumulated inside the battery module without a connection passage to the outside. When the condensed water or electrolyte solution accumulates inside the battery module, the busbar can be immersed in the condensate water or electrolyte solution. As the immersed busbar is corroded, a short circuit phenomenon may occur between the busbars. If a short circuit phenomenon occurs, a fire may occur due to the short circuit, and the performance of the battery module may be deteriorated.

DETAILED DESCRIPTION OF THE INVENTION

Technical Problem

It is an object of the present disclosure to provide a battery module including a structure discharging a condensed water or an electrolyte solution inside the battery module.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery module comprising: a battery cell stack in which a plurality of battery cells are stacked; a module frame for accommodating the battery cell stack; and an end plate for covering each of a front surface and a rear surface of the battery cell stack, wherein an opening is formed between a bottom portion of the module frame and the end plate.

The battery module further includes a busbar frame for covering each of the front surface and the rear surface of the battery cell stack, wherein a plurality of busbars may be mounted on each busbar frame, and the opening may be formed under the plurality of busbars so as to be separated from the plurality of busbars.

The battery module further includes an insulating cover formed between the busbar frame and the end plate, wherein the opening is formed in a portion corresponding to a lower end portion of the insulating cover.

The opening may be formed at a portion where the bottom portion of the module frame and the end plate meet.

The opening may be formed in a center of the portion where the bottom portion of the module frame and the end plate meet.

The upper end edge of the bottom portion of the module frame forming the opening may be chamfered.

The opening may comprise an inclined edge formed by the chamfering.

A portion where the bottom portion of the module frame and the end plate meet may be joined by welding.

Welding lines of the bottom portion of the module frame and a lower end portion of the end plate may be formed on both sides of the opening, respectively.

The opening may be formed by recessing an outer shell portion of the bottom portion of the module frame that meets the end plate.

In the opening, a first width in a direction parallel to a contact line between the bottom portion of the module frame and the end plate may be wider than a second width in a direction perpendicular to the contact line.

The first width may become wider in a direction of the end plate.

According to another embodiment of the present disclosure, there is provided a battery pack comprising the above-mentioned battery module.

Advantageous Effects

A battery module and a battery pack including the same according to one embodiment of the present disclosure can discharge a condensed water or an electrolyte solution inside the battery module to the outside, by forming an opening between the bottom portion of the module frame and the end plate.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view of a conventional battery module;

FIG. 2 is a cross section view of the conventional battery module;

FIG. 3 is an exploded perspective view of a battery module according to one embodiment of the present disclosure:

FIG. 4 is a view showing an opening according to one embodiment of the present disclosure;

FIG. 5 is a partial cross-sectional view showing a section C of FIG. 4;

FIG. 6 is a section D of FIG. 4 and is an enlarged view of an opening according to one embodiment of the present disclosure; and FIG. 7 is a section E of FIG. 5 and is an enlarged cross-sectional view of an opening according to one embodiment of the present disclosure.

DETAILED DESCRIPTION OF THE EMBODIMENTS

It should be appreciated that the exemplary embodiments, which will be described below, are illustratively described to assist in the understand the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Below, a battery module including an opening according to one embodiment of the present disclosure will be described with reference to FIGS. 3 to 5.

FIG. 3 is an exploded perspective view of a battery module according to one embodiment of the present disclosure. FIG. 4 is a view showing an opening according to one embodiment of the present disclosure.

Referring to FIGS. 3 and 4, the battery module according to one embodiment of the present disclosure includes a battery cell stack 100 in which a plurality of battery cells 110 are stacked; a module frame 200 for accommodating the battery cell stack 100; and an end plate 300 for covering the front and rear surfaces of the battery cell stack 100.

The battery cell 110 is a secondary battery and can be configured into a pouch-type secondary battery. Such a battery cell may be composed of a plurality of cells, and the plurality of battery cells may be stacked together so as to be electrically connected to each other, thereby forming the battery cell stack 100. Each of the plurality of battery cells may include an electrode assembly, a cell case, and an electrode lead protruding from the electrode assembly.

The module frame 200 accommodates the battery cell stack 100. The module frame 200 can be formed of a U-shaped frame 200 and an upper plate 230 as shown in FIG. 3. The U-shaped frame 200 may include a bottom portion 210 and both side portions 220. As shown in FIG. 3, the module frame 200 can be formed of upper, lower left and right surfaces, so that it can be formed in the forming of covering the four surfaces of upper, lower left and right of the battery cell stack 100. The battery cell stack 100 accommodated inside the module frame 200 can be physically protected through the module frame 200.

A busbar frame 400 is formed so as to cover the front and rear surfaces of the battery cell stack 100, is located on the front and rear surfaces of the battery cell stack 100, and can be connected with electrode leads formed to extend from the plurality of battery cells 110. In more detail, electrode leads extended through the busbar frame 400 are coupled to the plurality of busbars 410 mounted on the busbar frame 400, so that the battery cells 110 and the busbar 410 can be electrically connected.

The end plates 300 are respectively formed on the outside of the busbar frame 400 on the basis of the battery cell stack 100 so as to cover the battery cell stack 100 and the busbar frame 400.

The end plate 300 can protect the busbar frame 400, the battery cell stack 100, and various electrical equipment connected thereto from external impacts, and at the same time, guide the electrical connection between the battery cell stack 100 and an external power. An insulating cover 500 can be inserted between the end plate 300 and the busbar frame 400. The insulating cover 500 may cut off the electrical connection between the busbar frame 400 and the outside to ensure the insulation performance of the battery module.

A thermal conductive resin layer 600 can be formed on the bottom portion 210 of the module frame. The battery cell stack 100 is located on the upper side of the thermal conductive resin layer 600, and heat generated from the battery cell stack 100 can be transferred to the outside of the battery module. According to this embodiment, the thermal conductive resin layer 600 may be formed of a thermal resin.

According to the embodiment of the present disclosure, as shown in FIG. 4, an opening 210*a* can be formed between the bottom portion 210 of the module frame and the end plate 300. The electrolyte solution and condensed water formed inside the battery module through the opening 210*a* can be discharged to the lower side of the battery module.

Conventionally, the condensed water or electrolyte solution inside the battery module is accumulated in the space between the module frame bottom portion and the busbar frame, and the busbars are corroded by being immersed in the accumulated condensed water or electrolyte solution, which may cause a short circuit between the busbars. If a short circuit occurs between the busbars, a fire may occur due to the short circuit.

Thus, according to the embodiment of the present disclosure, an opening 210*a* is provided between the bottom portion 210 of the module frame and the end plate 300, and the electrolyte solution or condensed water that can be stored under the busbar inside the battery module can be discharged to the outside through the opening 210*a*, thereby capable of cutting off the contact between the busbar and moisture and preventing a short circuit phenomenon caused by corrosion of the busbar in advance. Thereby, it is possible to ensure the stability of the battery module.

Below, an opening according to one embodiment of the present disclosure will be described in more detail with reference to FIGS. 3 and 5 to 7.

FIG. 5 is a partial cross-sectional view showing a section C of FIG. 4. FIG. 6 is a section D of FIG. 4 and is an enlarged view of an opening according to one embodiment of the present disclosure. FIG. 7 is a section E of FIG. 5 and is an enlarged cross-sectional view of an opening according to one embodiment of the present disclosure.

Referring to FIG. 5, the opening 210*a* formed in the bottom portion 210 of the module frame may be formed under the plurality of busbars 410 so as to be separated from the plurality of busbars 410. Through this, even if condensed water or electrolyte solution is collected on the lower side of the busbars 410, it is formed in a structure in which it is immediately discharged through the opening 210*a* and the busbar 410, and condensed water or electrolyte solution do not contact each other. In addition, the opening 210*a* is formed in a portion corresponding to the lower end portion of the insulating cover 500 so that the condensed water that may be formed in the space between the insulating cover 500 and the end plate 300 passes through the lower end portion of the insulating cover 500, and can be discharged to the outside through the opening 210*a*.

According to the embodiment of the present disclosure, the opening 210*a* may be formed in the center of the portion where the bottom portion 210 of the module frame and the end plate 300 meet. Therefore, even if the electrolyte solution or condensed water is accumulated in the space between the busbar 410 formed at both side ends of the busbar frame 400 and the bottom portion 210 of the module frame, it can be more easily discharged to the outside through the opening 210*a* formed in the center of bottom portion 210 of the module frame.

Referring to FIG. 7, an upper end edge C of the bottom portion 210 of the module frame forming the opening 210*a* can be chamfered. Consequently, when the condensed water or electrolyte solution inside the battery module reaches the opening 210*a*, it can be more easily discharged to the outside along the inclined edge portion C of the chamfered opening 210*a*.

Except for the opening 210*a*, a portion where the bottom portion 210 of the module frame and the end plate 300 meet can be coupled by welding. Thus, the welding lines of the bottom portion 210 of the module frame and the lower end portion of the end plate 300 may be formed on both sides of the opening 210*a*, respectively, as shown in FIG. 4. Not only the bottom portion of the module frame but also the module frame 200 and the upper plate 230 can be coupled together via welding with an edge portion of the end plate 300.

Referring to FIG. 6, the opening 210*a* can be formed by recessing an outer shell portion of the bottom portion 210 of the module frame that meets the end plate 300. At this time, a first width W1 in a direction parallel to the contact line L between the bottom portion 210 of the module frame and the end plate 300 can be formed wider than a second width W2 in a direction perpendicular to the contact line L.

Since the busbars 410 are arranged in a direction parallel to the contact line L of the bottom 210 of the module frame and the end plate 300 on the busbar frame 400, the first width W1 in the direction parallel to the contact line L is formed wider than the second width W2 in the direction perpendicular to the first width W1. Thereby, before the busbars 410 arranged parallel to the contact line L and the condensed water or electrolyte solution come into contact with each other, the liquid may be rapidly discharged through the opening 210*a* formed long in the arrangement direction of the busbars.

The first width W1 of the opening 210*a* may become wider as it approaches the end plate 300. The liquid located between the end plate 300 and the bottom portion 210 of the module frame can come into contact with the two surfaces of the end plate 300 and the bottom 210 of the module frame to increase the adhesion to the two surfaces. Thus, it may be difficult to smoothly discharge the liquid. Therefore, the first width W1 of the opening 210*a* may be designed to become wider in the direction in which the end plate 300 is located, so that the electrolyte solution or the condensed water can be discharged more smoothly.

The above-mentioned battery module can be included in the battery pack. The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: battery cell stack
110: battery cell
200: module frame
210: bottom portion of the module frame

220: both side part of the module frame
230: upper plate
210*a*: opening
300: end plate
400: busbar frame
410: busbar
500: insulating cover
600: thermal conductive resin layer
L: contact line
W1: first width
W2: second width
C: Upper end edge of bottom portion of the module frame

The invention claimed is:

1. A battery module comprising:

a battery cell stack in which a plurality of battery cells are stacked;

a module frame for accommodating the battery cell stack having a bottom portion under the battery cell stack and side portions extending upward from the bottom portion to cover side surfaces of the battery cell stack; and end plates for covering each of a front surface and a rear surface of the battery cell stack, wherein an opening is formed between an edge of the bottom portion of the module frame and at least one end plate of the end plates in a direction perpendicular to a stacking direction of the battery cell stack.

2. The battery module of claim 1, further comprising:

a busbar frame for covering each of the front surface and the rear surface of the battery cell stack, wherein a plurality of busbars are mounted on each busbar frame, and wherein the opening is formed under the plurality of busbars so as to be separated from the plurality of busbars.

3. The battery module of claim 2, further comprising:

an insulating cover formed between each busbar frame and each end plate, wherein the opening is formed in a portion corresponding to a lower end portion of the respective insulating cover.

4. The battery module of claim 1, wherein the opening is formed at a portion where the bottom portion of the module frame and the at least one end plate meet.

5. The battery module of claim 4, wherein the opening is formed in a center of the portion where the bottom portion of the module frame and the at least one end plate meet.

6. The battery module of claim 1, wherein an upper end edge of the bottom portion of the module frame forming the opening is chamfered.

7. The battery module of claim 6, wherein the opening comprises an inclined edge formed by the chamfering.

8. The battery module of claim 1, wherein a portion where the bottom portion of the module frame and the at least one end plate meet is joined by welding.

9. The battery module of claim 8, wherein welding lines of the bottom portion of the module frame and a lower end portion of the at least one end plate are formed on both sides of the opening, respectively.

10. The battery module of claim 1, wherein the opening is formed by recessing an outer shell portion of the bottom portion of the module frame that meets the at least one end plate.

11. The battery module of claim 1, wherein in the opening, a first width in a direction parallel to a contact line between the bottom portion of the module frame and the at least one end plate is wider than a second width in a direction perpendicular to the contact line.

12. The battery module of claim 11, wherein the first width becomes wider in a direction of the at least one end plate.

13. A battery pack comprising the battery module of claim 1.

14. The battery module of claim 1, wherein the bottom portion of the module frame and the at least one end plate contact each other except for the opening along a contact line, and wherein the bottom portion of the module frame and the at least one end plate are welded along the contact line.

* * * * *